United States Patent Office 3,262,863
Patented July 26, 1966

3,262,863
PREPARATION OF STABLE LIPASE COMPOSITION AND PURIFICATION THEREOF
Juichiro Fukumoto, 4-227 Kirihata, Nagoyama, Takarazuka, Japan; Yoshio Tsujisaka, 21 1-chome, Tamade-Hondori, Nishinari-ku, Osaka, Japan; and Mieko Iwai, 11 3-chome, Haramicho, Ikuno-ku, Osaka, Japan
No Drawing. Filed Apr. 21, 1964, Ser. No. 361,558
Claims priority, application Japan, Apr. 27, 1963, 38/22,040
2 Claims. (Cl. 195—66)

This invention relates to a process for preparing stable lipase compositions.

Lipase is very useful in the medicinal and industrial fields as other hydrolytic enzymes. For example, it can be used in the treatment of digestive disturbances of human beings and in the reformation of oil, fat and various foods. But its commercial application is more restrictive than that of any other hydrolytic enzyme. Such restriction might be due to its unstableness both during purifying and during storage. The above restriction is also attributed to its production, since most commercial lipase had been prepared from animal or plant sources.

We have found that the unstableness of lipase is mostly attributed to an enzymic action of the protease contaminated therein. On the other hand, we have discovered that *Rhizopus delemar* produces lipase on its cultivation in a liquid medium, and the production of protease on the cultivation of *Rhizopus delemar* may be controlled by adjusting the contents of nitrogen and carbon sources in the medium. According to our experiments, we have found that *Rhizopus delemar* produces a large amount of protease when the cultivation is carried out in a liquid medium in which the nitrogen content is low and the carbon content is relatively high. Contrary to this, if the nitrogen content is higher or the carbon content is lower, the production of protease will be decreased. We have also found that the production of protease can be substantially depressed without affecting the production of lipase by cultivating *Rhizopus delemar* in a medium containing about 0.5 to 1.5% of nitrogen sources based on elementary nitrogen; about 0.4 to 1.5% of carbon sources based on elementary carbon and a small amount of inorganic substance at a pH from 5.0 to 6.0 (Table 1).

We have also discovered that lipase has a tendency to be inactivated by iron ions during its purification process or during storage. We have observed that lipase may be rapidly inactivated in the presence of more than about 0.5 p.p.m. of iron ions during manufacturing operations. As the purification of lipase proceeds, the more proportions of lipase are inactivated with the larger p.p.m. of iron (Table 2). Accordingly, we have found that the iron concentration should be kept less than 0.5 p.p.m. throughout its manufacturing operations.

According to the present invention, *Rhizopus delemar* is inoculated and incubated for 2–4 days on an aqueous nutrient medium which contains from 0.5 to 1.5% (based on elementary nitrogen) of a nitrogen source such as pepton, soybean extract or corn steep liquor; from 0.4 to 1.5% (based on elementary carbon) of a carbon source such as glucose, sucrose or soluble starch; and a small amount of inorganic substance such as $KH_2PO_4$, $MgSO_4$ and the like, at a pH from about 5.0 to about 6.0. The concentration of iron ion in the medium is kept less than 0.5 p.p.m. The incubation is preferably carried out at a temperature of 25–35° C. According to this invention, when an initial pH of the medium is adjusted to about 5.5, the final pH will rise to about 6.5 to about 8.3 after cultivation.

Recovery of lipase fraction from the culture is carried out by conventional ammonium sulfate fractionation. Thus the culture is filtered, and ammonium sulfate is added to the filtrate. The resulting precipitate is collected after the degree of saturation reaches to between 0.35 and 0.65. The resulting product contains more than 95% of total lipase activities of the starting material.

According to this invention, the crude enzymic composition thus obtained is further purified. The crude product is dissolved in water, and the resultant solution is desalted to separate ammonium sulfate. As the desalting method, dialysis or gel filtration using "Sephadex" may be employed. When the culture filtrate contains iron ion near the allowable limit, it is desirable to carry out the dialysis against pure water containing about 0.0001 M of chelating agent such as sodium citrate, EDTA. By this treatment, almost all parts of iron ion are removed leaving dialysate, in which the iron content has decreased to less than 0.01 p.p.m. The resulting solution is adjusted to a pH between about 4.5 and about 6.0, and is passed through a weak anion-exchange resin such as Duolite A-2, whereby most of proteinous and other impurities are adsorbed onto the resin.

The passed solution is then contacted with a weak cation-exchange substance to adsorb lipase fraction thereon after pH is adjusted at about 3.5 to about 5.0 with an organic acid such as from 1/50 M to 1/100 M aqueous solution of acetic acid. Examples of the weak cation-exchange substance are Amberlite IRC–50, Duolite CS–101, SE–Sephadex and carboxy-methyl-cellulose. Purified lipase solution is obtained when the ion-exchange substance is eluted with a buffer solution of about pH 5.5 or a 0.2–0.4% aqueous solution of an inorganic neutral salt such as sodium chloride, ammonium sulfate and the like.

When a large amount of an organic solvent such as methanol, ethanol or acetone is added to the lipase solution thus prepared and the resulting precipitate is dried, there may be obtained purified lipase powder. Total yield of lipase activity is about 40–50% of the calculation based on that of the cultured medium. As will be manifest from the working examples which follow, the preferred species of microorganism to be employed in this invention is *Rhizopus delemar*.

EXPERIMENT 1

*Rhizopus delemar* was submergedly cultivated for 3 days at 28° C. on aqueous nutrient media containing pepton and glucose in amounts as tabulated below, 0.1% of $NaNO_3$, 0.1% of $KH_2PO_4$ and 0.05% of $MgSO_4$, and then the media were sterilized by autoclaving. The cultural conditions and the results obtained are shown in Table 1 (10% of peptone is corresponding to about 1.0% of elementary nitrogen):

Table 1

| Composition of cultural medium | | pH | | Lipase activity (unit/ml.) | | Protease activity (u./ml.) Immediately after cultivation |
| --- | --- | --- | --- | --- | --- | --- |
| Peptone (percent) | Glucose (percent) | Medium | Culture filtrate | Immediately after cultivation | After 5 days | |
| 3 | 5 | 5.5 | 4.8 | 75 | 5 | 350 |
| 5 | 3 | 5.5 | 5.4 | 112 | 23 | 235 |
| 5 | 2 | 5.5 | 6.5 | 350 | 340 | 7 |
| 7.5 | 2 | 5.5 | 7.4 | 715 | 715 | 0 |
| 10 | 3 | 5.5 | 7.6 | 740 | 740 | 0 |
| 10 | 2 | 5.5 | 8.0 | 650 | 635 | 0 |
| 10 | 1 | 5.5 | 8.3 | 188 | 175 | 0 |

EXPERIMENT 2

To illustrate the inhibitory effect of iron ion on lipase activity, the following test was carried out. In the experiment, each sample was allowed to stand for 60 minutes in the presence of ferrous ions (ferrous sulfate) of each of the concentrations as tabulated, and then the remaining lipase activities were determined.

The results obtained are shown in Table 2.

Table 2

| $Fe^{++}$ contents (p.p.m.) | Residual lipase activity (unit/ml.) | | |
| --- | --- | --- | --- |
| | A | B | C |
| 0 | 180 | 150 | 170 |
| 0.1 | 180 | 149 | 170 |
| 0.5 | 178 | 145 | 150 |
| 1.0 | 112 | 58 | 44 |
| 2.0 | 34 | 14 | 11 |
| 5.0 | 2 | 0 | 0 |

Sample A: Diluted culture filtrate prepared by culturing Rhizopus delemar on the medium as in Example 1. (Lipase 180 units/ml.)

Sample B: Aqueous solution of a crude lipase fraction which was prepared by fractionating the above mentioned Sample A with ammonium sulfate. (Lipase 150 units/ml.)

Sample C: Purified lipase fraction which was prepared by purifying the above mentioned Sample B with ion-exchange and dialysing techniques. (Lipase 170 units/ml.)

DEFINITIONS OF THE ENZYME UNIT

*Lipase.*—One unit of the enzymic activity was defined as an activity sufficient to produce an equivalent amount of fatty acid to 14 mg. of oleic acid when 2 g. of olive oil was saponified with the enzyme at pH 5.6 and 30° C. for 150 minutes.

*Protease.*—One unit of the enzymic activity was defined as an activity sufficient to produce 10γ (calculated as tyrosine) of amino acid or peptide which is soluble in trichloro-acetic acid when 3 ml. of 1% milk casein solution was hydrolysed with the enzyme at pH 3.7 and 40° C. for 10 minutes.

EXAMPLE

A strain of Rhizopus delemar was incubated on the following aqueous medium:

| | |
| --- | --- |
| Glucose, percent | 2 |
| $KH_2PO_4$, percent | 0.1 |
| $MgSO_4 \cdot 7H_2O$, percent | 0.05 |
| Peptone, percent | 7 |
| $Fe^{++}$, p.p.m. | 0.15 |
| PH | 5.5 | and incubated at 28° C. for three days with shaking.

The cultured medium having 700 units/ml. of lipase was filtered. The filtrate (Sample A in Experiment 2) was fractionated with ammonium sulfate, in which $Fe^{++}$ content was 0.8 p.p.m. The precipitate which results at 0.35–0.65 degree of saturation was collected, and was dissolved into water. The solution (Sample B in Experiment 2) was dialysed to desalt ammonium sulfate. The dialysate was adjusted to pH 5.0, and was passed through the column of a weak anion-exchange resin (Duolite A–2 resin). The passed solution having 80% of lipase activity of the starting material was then adjusted to pH 4.5 with 1/50 M aqueous solution of acetic acid, and was passed through the column of a weak cation-exchange resin (Amberlite IRC–50). The resin was eluted with aqueous solutions of NaCl, in which the concentration was raised successively. The fractions at 0.2–0.4 M NaCl were collected and dialysed (Sample C in Experiment 2). Methanol was added to the dialysate. The resultant precipitate was filtered at 10° C., and dried at a low temperature. The enzymic powder thus prepared has the activity corresponding to 50% that of the starting material and showed a lipase potency 500 times as high as that of the culture filtrate based on the proteinous contents. Distilled water containing less than 0.1 p.p.m. of $Fe^{++}$ was used in the foregoing cases.

What we claim is:

1. A process for preparing stable lipase composition which comprises cultivating Rhizopus delemar on an aqueous nutrition medium comprising 0.5 to 1.5% of nitrogen source based on elementary nitrogen, 0.4 to 1.5% of carbon source based on elementary carbon, and a small amount of inorganic substance, the pH of said medium being in the range of from 5.0 to 6.0, until said medium is imparted a lipase activity, and recovering lipase fractions in the protease-free form from the cultured medium.

2. A process according to claim 1, wherein said enzyme is purified by collecting the precipitate resulting from the ammonium sulfate fractionation of the culture filtrate at the saturation degree of 0.35 to 0.65, and treating the desalted aqueous solution of the precipitate with a weak anion-exchange resin at a slightly acidic condition to remove impurities, subsequently treating the solution with a weak cation-exchange substance to adsorb lipase fraction on said substance, eluting said substance with a buffer solution of pH about 5.5 or 0.2–0.4% aqueous solution of inorganic neutral salt, and adding a sufficient amount of organic solvent to the dialysate to precipitate lipase, and drying the precipitate.

References Cited by the Examiner

FOREIGN PATENTS 358,647   7/1961   Japan.

A. LOUIS MONACELL, *Primary Examiner.*

L. SHAPIRO, *Assistant Examiner.*